(12) United States Patent
Gardner

(10) Patent No.: US 7,178,180 B2
(45) Date of Patent: Feb. 20, 2007

(54) STOW-AWAY BED

(75) Inventor: Stewart E. Gardner, Bristol, IN (US)

(73) Assignee: R-N-R International, Inc., Bristol, IN (US)

( * ) Notice: Subject to any disclaimer, the term of this patent is extended or adjusted under 35 U.S.C. 154(b) by 0 days.

(21) Appl. No.: 11/284,314

(22) Filed: Nov. 21, 2005

(65) Prior Publication Data

US 2006/0130231 A1 Jun. 22, 2006

(51) Int. Cl.
*A47C 17/84* (2006.01)
(52) U.S. Cl. ............... 5/10.1; 5/118; 5/9.1; 296/190.02
(58) Field of Classification Search ........... 5/9.1, 5/10.1, 10.2, 118, 103, 169, 170, 131, 412; 296/190.02
See application file for complete search history.

(56) References Cited

U.S. PATENT DOCUMENTS

| | | | | |
|---|---|---|---|---|
| 3,480,975 A | * | 12/1969 | Colchin et al. ............ | 5/118 |
| 3,623,168 A | * | 11/1971 | Rouch ....................... | 5/10.1 |
| 3,745,595 A | * | 7/1973 | Nagy ......................... | 5/9.1 |
| 5,638,559 A | * | 6/1997 | Natri et al. ................ | 5/10.2 |
| 6,231,114 B1 | * | 5/2001 | Warmoth ................... | 296/170 |
| 6,557,190 B2 | * | 5/2003 | Bailey ....................... | 5/118 |

* cited by examiner

*Primary Examiner*—Michael Trettel
(74) *Attorney, Agent, or Firm*—R. Tracy Crump

(57) ABSTRACT

A stow-away bed is disclosed that includes a flat rectangular deck pivotally mounted between opposed vehicle end walls by a pair of parallel swing arms. The parallel swing arms allow the bed deck to remain horizontal as the deck is manually swung between the storage and sleep positions. The stow-away bed is pivotally mounted between opposed vehicle end walls for movement between a sleep position where the bed deck is suspended adjacent the vehicle ceiling and a sleep position, where the bed deck is suspended from the vehicle ceiling. A pair of elastic cords connect the bed deck to the vehicle side wall. The elastic cords pull the bed deck toward the vehicle sidewall and help hold the bed deck in the sleep position.

1 Claim, 6 Drawing Sheets

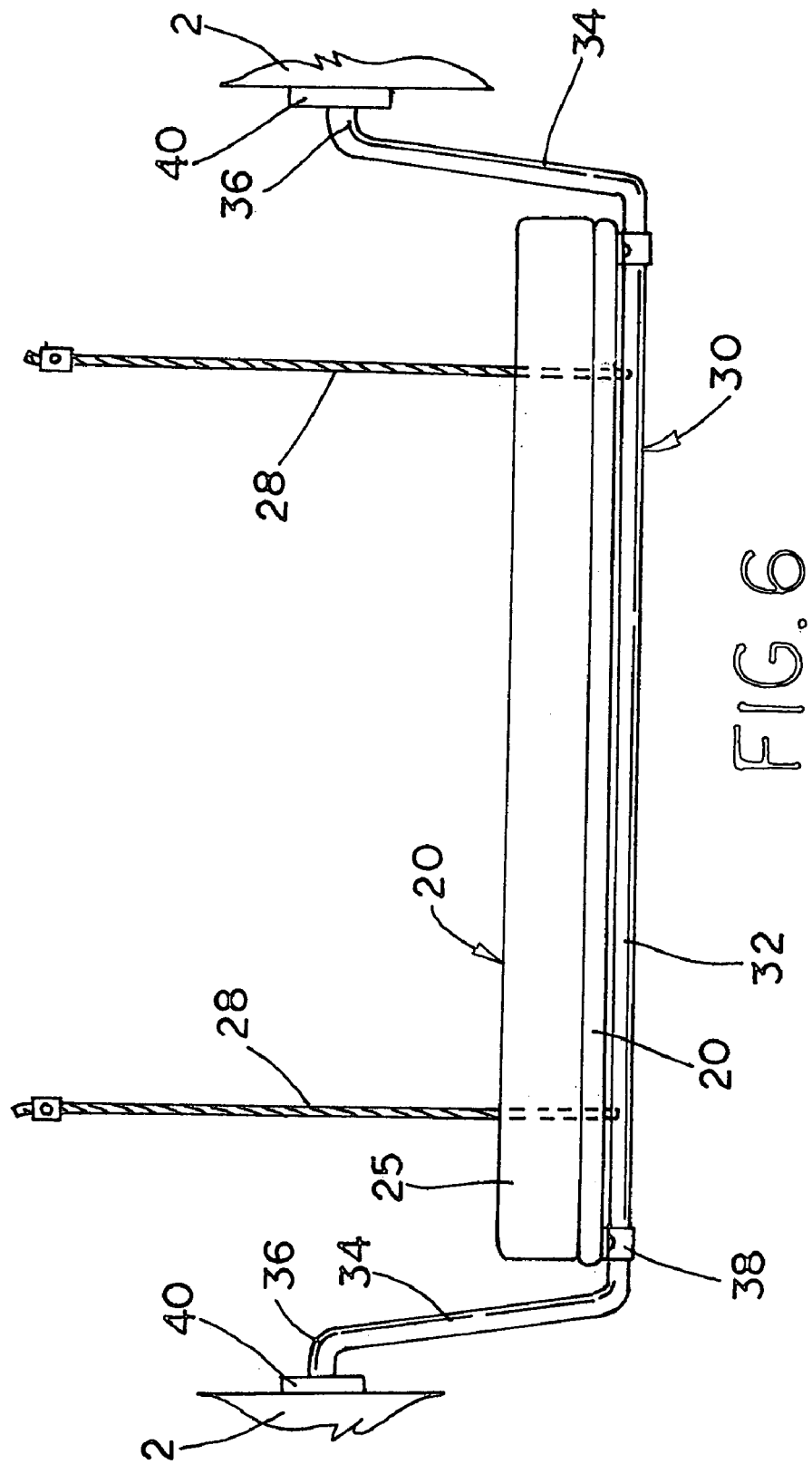

STOW-AWAY BED

BACKGROUND AND SUMMARY OF THE INVENTION

Stow-away beds, seats and tables are common features in recreational vehicles where living space is limited. Stow-away beds, seats and tables are designed to be quickly and conveniently stored to increase living space when not in use. The present invention seeks to provide an improved stow-away bed, seat, table or similar structure for recreational vehicles.

The stow-away bed embodying the teachings of the present invention includes a flat rectangular deck pivotally mounted between opposed vehicle end walls by a pair of parallel swing arms. The parallel swing arms allow the bed deck to remain in a horizontal position as the deck is manually swung between the storage and sleep positions. The stow-away bed is pivotally mounted between opposed vehicle end walls for movement between a storage position where the bed deck is suspended adjacent the vehicle ceiling and a sleep position where the bed deck is suspended from the vehicle ceiling. A pair of elastic cords connect the bed deck to the vehicle side wall. The elastic cords pull the bed deck toward the vehicle sidewall and help hold the bed deck in the sleep position.

Accordingly, the present invention provides a simple stow-away bed design that is simple to operate and economical to produce. The bed uses a simple parallel swing arm design, which is easy to manually operate and maintain. The bed uses elastic cords to safely secure the bed in its sleep position. Furthermore, the present invention can readily be configured as a bed, seat or table. These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which:

FIG. 6 is a front side view of the bed of FIG. 1 illustrating the bed in the sleep position.

DESCRIPTION OF THE PREFERRED EMBODIMENT

Figure 1:
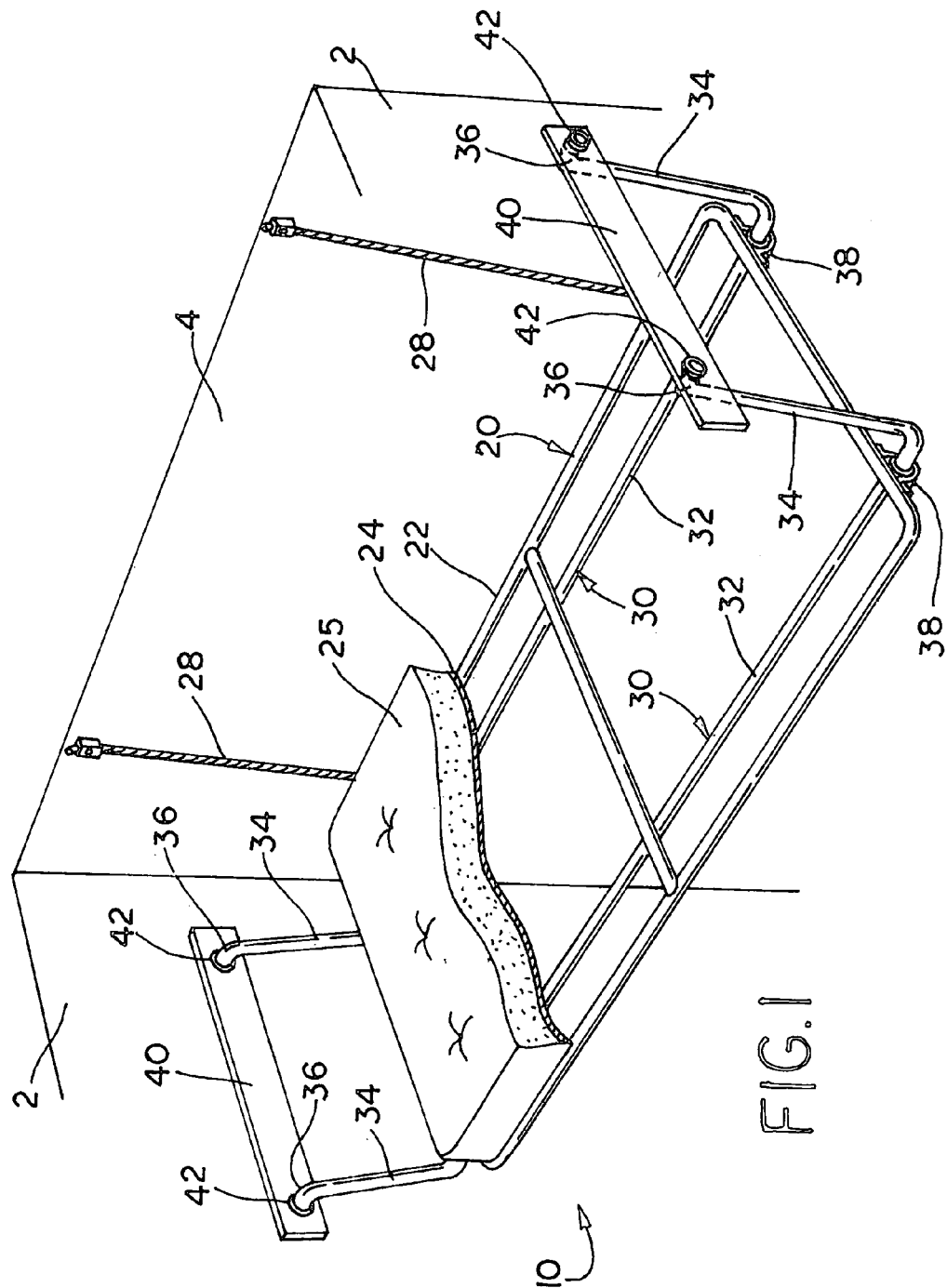
FIG. 1 is a perspective view of an embodiment of the present invention showing a swinging stow-away bed with portions cut away.

Referring now to the drawings, reference numeral 10 generally designates the stow-away bed, which forms an embodiment of the present invention. Bed 10 is intended for use in any conventional recreational vehicle.

As shown, bed 10 includes a flat rectangular horizontal deck 20 pivotally mounted between opposed vehicle end walls 2 by a pair of parallel swing arms 30. Deck 20 supports a mattress or seat cushion, but can also serve as a table top if necessary. Deck 20 includes a support frame 22, upon which a sturdy sheet of plywood 24 or other suitable decking material is bolted. Deck frame 22 is generally constructed of steel or aluminum tubing. Swing arms 30 are constructed from a length of steel or aluminum tubing and have a U-shaped configuration. The length of tubing has two 90 degree bends that form a long horizontal section 32 and two opposed end sections 34. Horizontal sections 32 of each swing arm 30 extend longitudinally across the bottom of deck frame 22 and are pivotally secured to deck frame 22 by journal brackets 38, which allow end sections 34 to pivot about a plane perpendicular to deck 20. Each end section 34 terminates in a foot 36 that is journalled in mounting bar 40 fixed to vehicle end walls 2. Swing arm feet 36 are rotatably seated within a bearing or sleeve 42 fitted in a bore of each mounting bar 40. A pair of elastic cords 28 are connected between deck frame 22 and the vehicle side wall 4.

Figure 2:
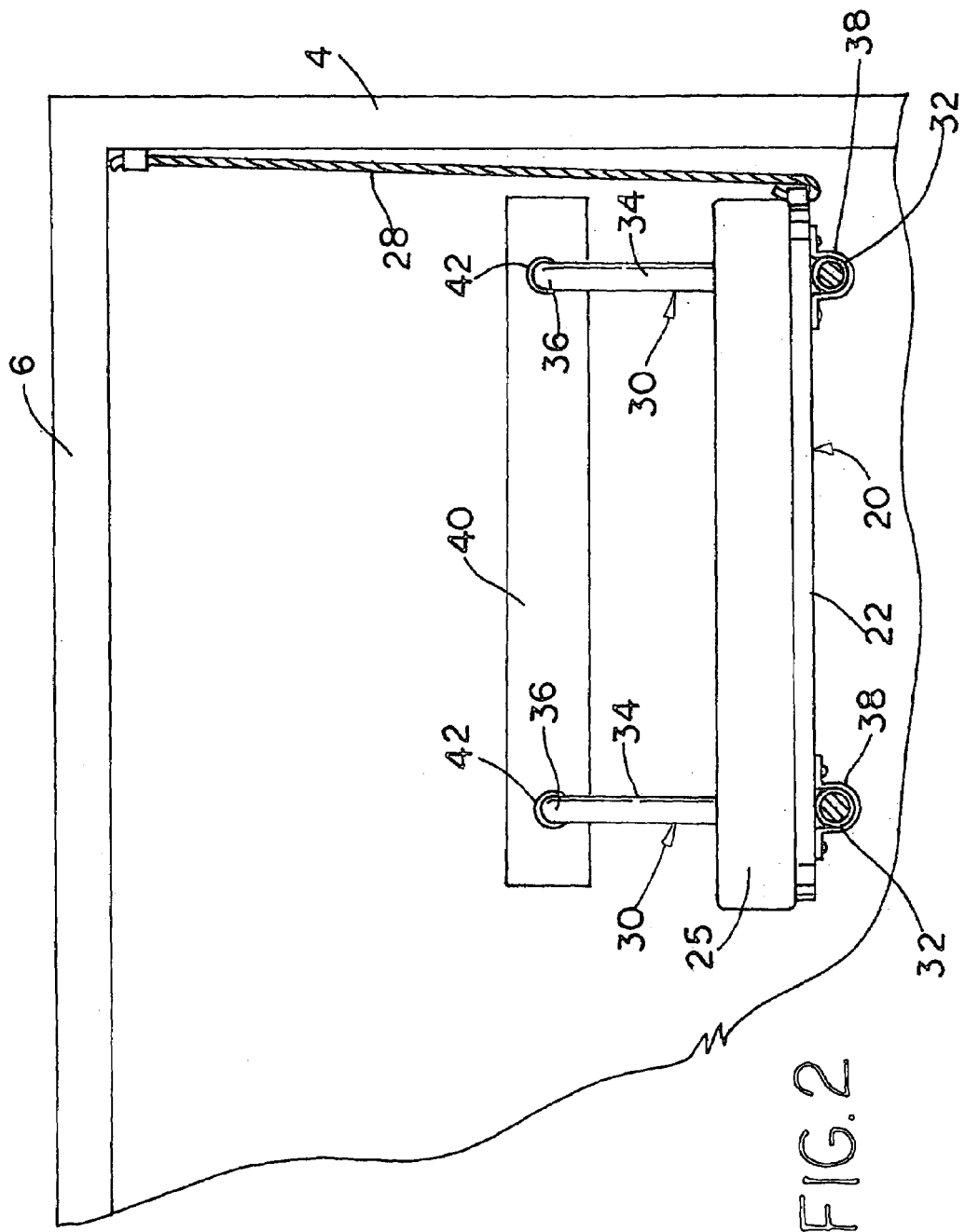
FIG. 2 is an end view of the bed of FIG. 1 illustrating the bed in the sleep position.
Figure 3:
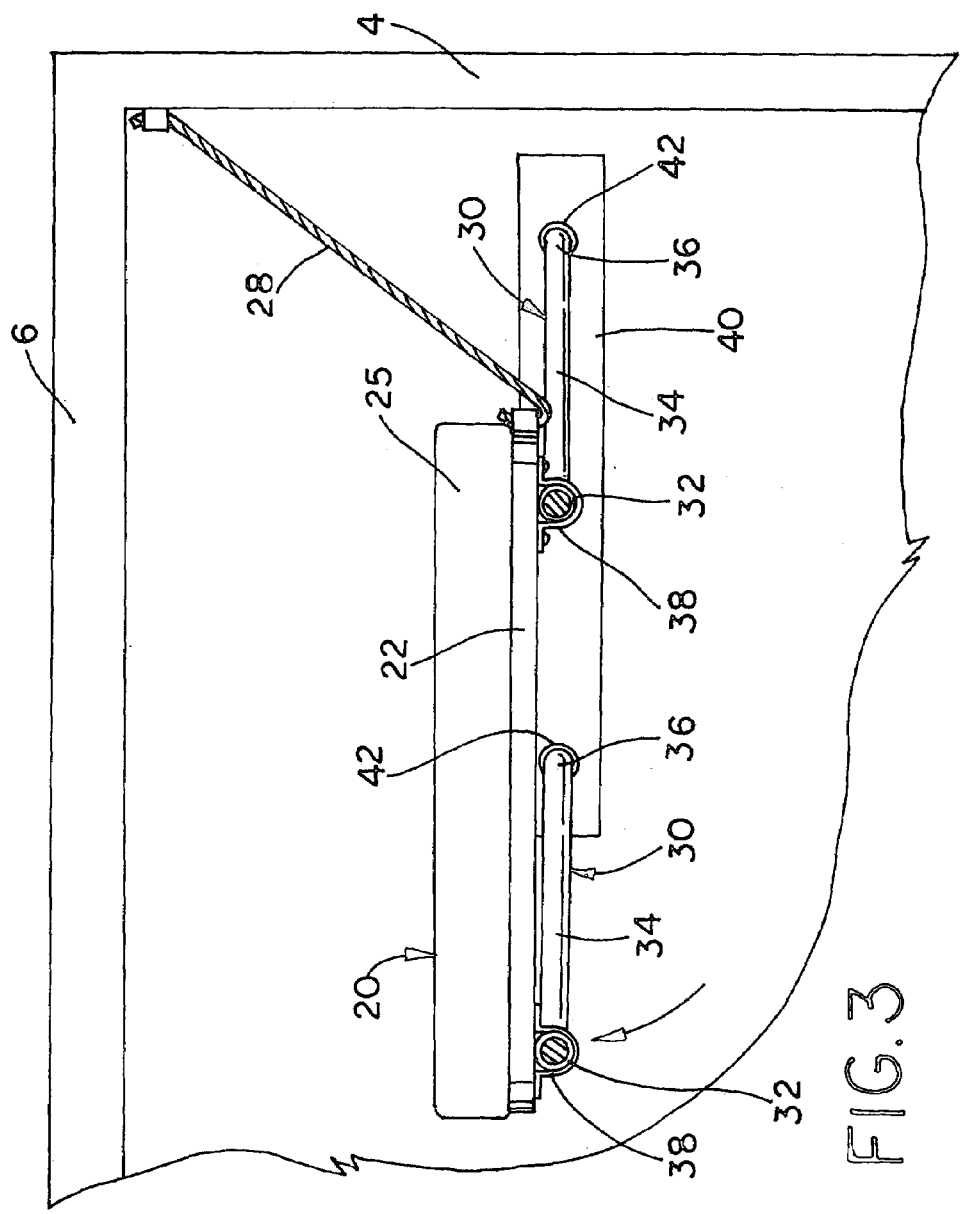
FIG. 3 is an end view of the bed of FIG. 1 illustrating the bed shifting from the sleep position.
Figure 4:
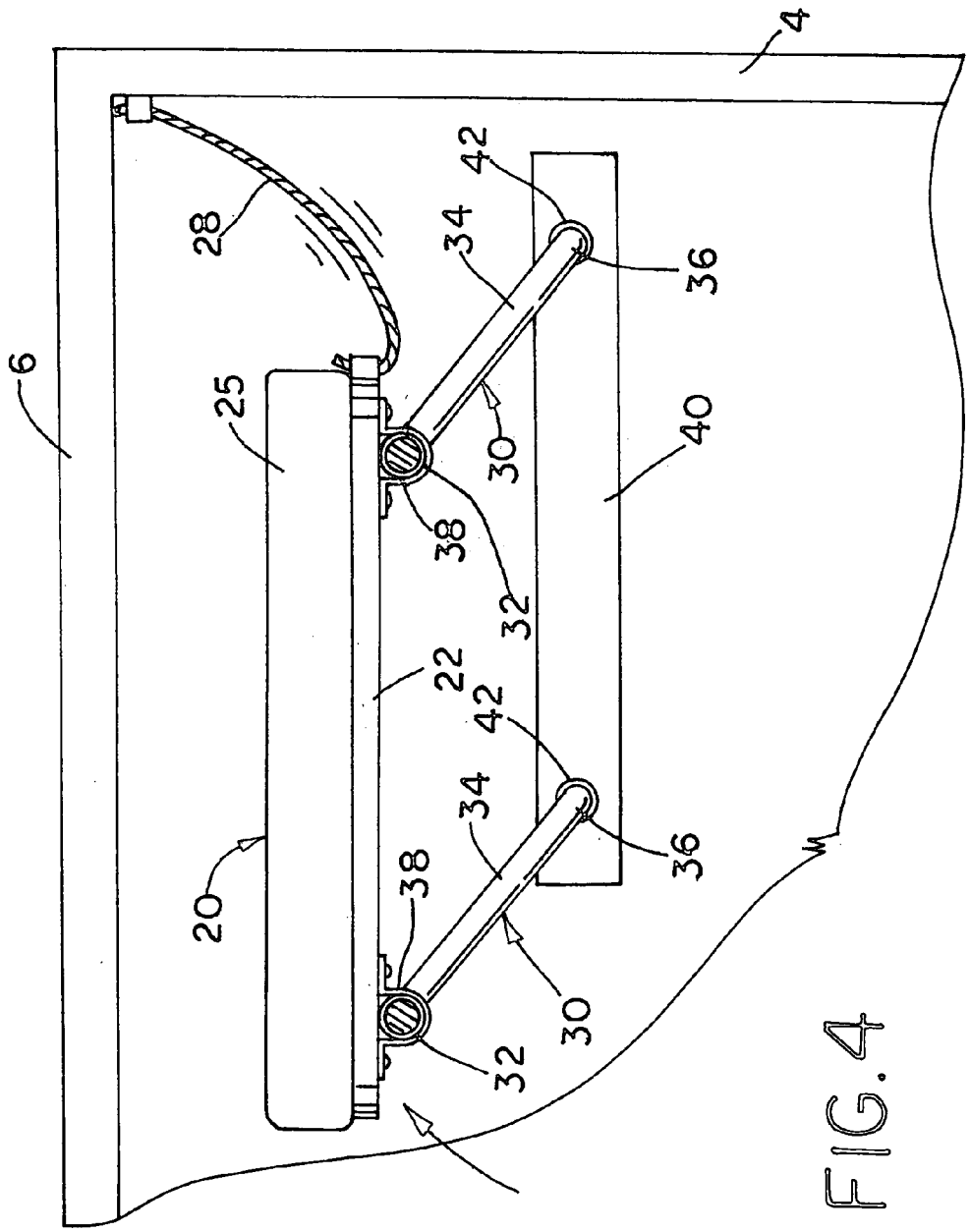
FIG. 4 is another end view of the bed of FIG. 1 illustrating the bed in the sleep position.
Figure 5:
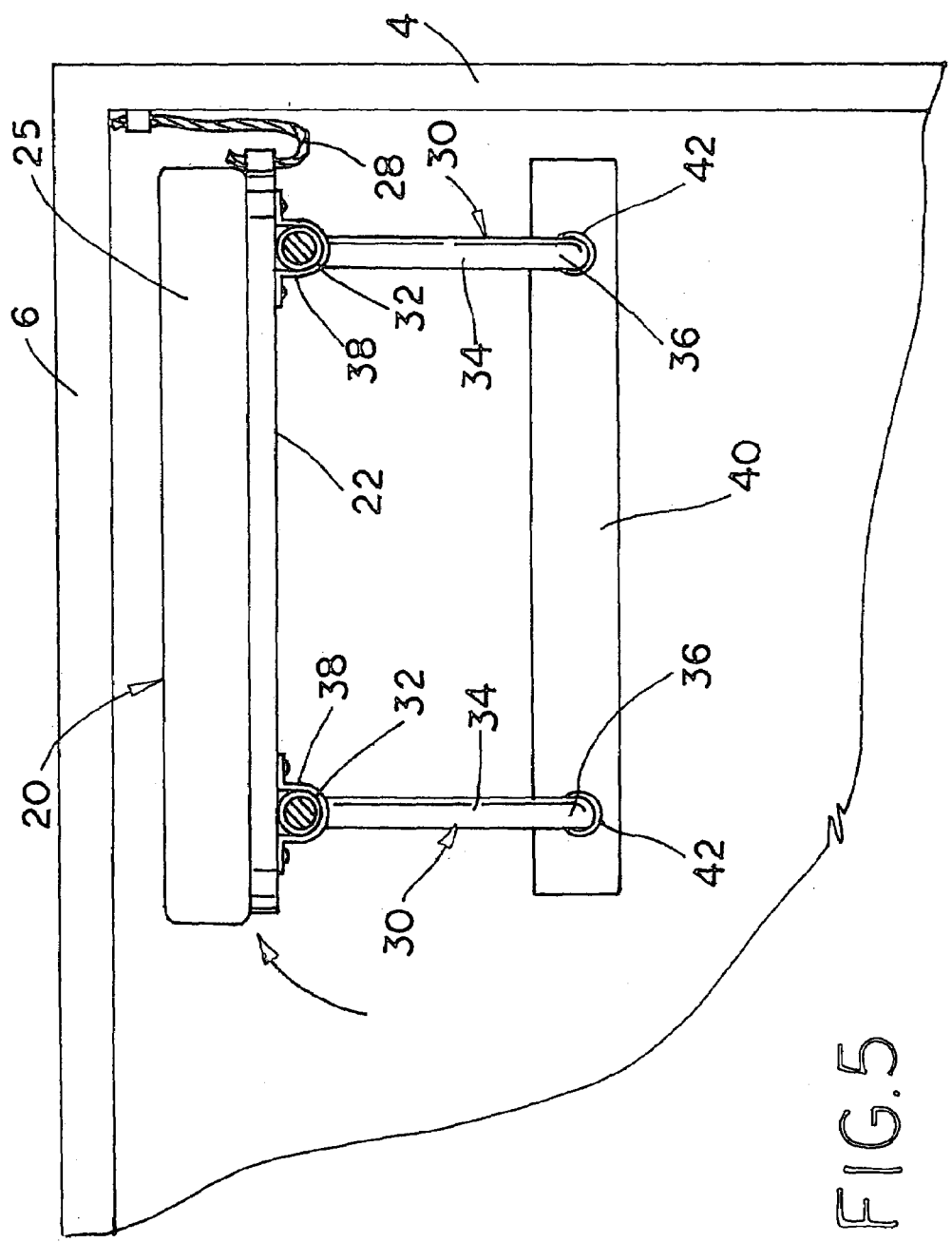
FIG. 5 is an end view of the bed of FIG. 1 illustrating the bed in the storage position.

As shown, bed 10 is pivotally mounted between opposed vehicle end walls 2 for movement between a sleep position (FIGS. 1, 2 and 6) and a storage position (FIG. 5). In the storage position, deck 20 is rotated over mounting bars 40 and is suspended adjacent the vehicle ceiling 6. In the sleep position, deck 20 is rotated below mounting bars 40 and is suspended from vehicle ceiling 6. The pivotal connection of parallel swing arms 30 and deck 20 allows the deck to remain substantially horizontal as the deck is manually swung between the storage and sleep positions. As shown in FIGS. 2–5, end sections 34 of swing arms 30 move in parallel with each other pivoting about four parallel horizontal axis as deck 20 is manually swung between the storage and sleep positions. This motion of the pair of parallel swing arms 30 is best described as a "pivoting parallelogram" and ensures that deck 20 remains horizontal as the bed is swung between the storage and sleep positions. As shown in FIGS. 2 and 3, elastic cords 28 are used to exert a force on deck 20 to pull the deck back toward vehicle side wall 4. The tension in elastic cords 28 helps hold deck 20 in the sleep position by pulling the deck towards vehicle side wall 4 so that the pivot points of swing arms 30 are vertically past center. Elastic cords 28 also reduce the tendency of deck 20 to swing. It should be noted that in the storage position, deck 20 will come to rest against vehicle sidewall 4 so that the pivot points of swing arms 30 are vertically past center, thereby securing the deck in the storage position.

One skilled in the art will note that the present invention has several advantages over stow-away beds, seats and tables used in recreational vehicles. The present invention provides a simple stow-away bed design that is economical to produce and can be readily configured for use as a bed, seat or table. The bed uses a simple parallel swing arm design, which is easy to manually operate and maintain. The bed uses elastic cords to safely secure the bed in its sleep position.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A stow-away bed for use in an area defined by spaced end walls and a side wall extending between the end walls, the bed comprising:

a deck for supporting a mattress thereon, the deck having a first end and second end opposite the first end;

a mounting bar secured horizontally to each of the side walls;

a pair of parallel U-shaped swing arms pivotally mounted between the end walls, each of the pair of swing arms having an elongated middle section and two opposed end sections, each swing arm end section pivotally connected to one of the mounting bars, the deck seated atop the pair of swing arms for movement between a storage position where the deck is spaced above the mounting bars and a sleep position where the deck is suspended below the mounting bars; and a length of elastic cord connecting the deck to the vehicle side wall so that the length of cord provides some resistance to the deck as the deck is shifted between the storage position and the sleep position and secures the deck in the sleep position.

\* \* \* \* \*